(12) United States Patent
Wirsch, Jr. et al.

(10) Patent No.: US 10,250,110 B2
(45) Date of Patent: Apr. 2, 2019

(54) FASTENING ASSEMBLY FOR ELECTRIC MACHINE AND RECTIFIER THEREFOR

(71) Applicant: GE Aviation Systems LLC, Grand Rapids, MI (US)

(72) Inventors: Paul James Wirsch, Jr., Vandalia, OH (US); William James Johnsman, Vandalia, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 499 days.

(21) Appl. No.: 14/895,151

(22) PCT Filed: Jun. 3, 2013

(86) PCT No.: PCT/US2013/043814
§ 371 (c)(1),
(2) Date: Dec. 1, 2015

(87) PCT Pub. No.: WO2014/196949
PCT Pub. Date: Dec. 11, 2014

(65) Prior Publication Data
US 2016/0118868 A1  Apr. 28, 2016

(51) Int. Cl.
*H02K 15/00* (2006.01)
*H02K 19/38* (2006.01)
(Continued)

(52) U.S. Cl.
CPC .......... *H02K 15/0006* (2013.01); *B23P 19/04* (2013.01); *H02K 5/225* (2013.01);
(Continued)

(58) Field of Classification Search
CPC .... H02K 15/0006; H02K 15/02; H02K 19/38; H02K 5/225; H02K 15/00;
(Continued)

(56) References Cited

U.S. PATENT DOCUMENTS 4,745,315 A * 5/1988 Terry, Jr. .............. H02K 11/042
257/658
5,414,318 A    5/1995 Shimizu et al.
(Continued)

FOREIGN PATENT DOCUMENTS

JP    2006320086 A    11/2006

OTHER PUBLICATIONS

International Search Report and Written Opinion issued in connection with corresponding PCT Application No. PCT/US2013/043814 dated Mar. 4, 2014.

*Primary Examiner* — Sarang Afzali
*Assistant Examiner* — Darrell C Ford
(74) *Attorney, Agent, or Firm* — GE Aviation Systems LLC; William Andes (57) ABSTRACT

A method of assembling a rotating rectifier having multiple radially spaced bus bars with a corresponding fastener to an electrical machine having at least one machine with a stator and a rotor mounted on a rotating shaft, the method includes inserting the rotating rectifier into a hollow portion of the rotating shaft, axially aligning the fasteners with a corresponding radial opening in the rotating shaft, inhibiting an inward radial movement of the fasteners by inserting an inhibiting tool into an interior defined by the multiple radially spaced bus bars, and at least partially securing the fasteners to a corresponding fastener on at least one of the rotor and rotating shaft while the inhibiting tool resides in the interior.

14 Claims, 7 Drawing Sheets

(51) Int. Cl.
*B23P 19/04* (2006.01)
*H02K 5/22* (2006.01)
*H02K 15/02* (2006.01)
*B23P 19/06* (2006.01)

(52) U.S. Cl.
CPC ............ *H02K 15/00* (2013.01); *H02K 19/38* (2013.01); *B23P 19/06* (2013.01); *H02K 15/02* (2013.01); *Y10T 29/49009* (2015.01); *Y10T 29/49012* (2015.01)

(58) Field of Classification Search
CPC ......... Y10T 29/49009; Y10T 29/49012; B23P 19/04; B23P 19/06
See application file for complete search history.

(56) References Cited

U.S. PATENT DOCUMENTS

| | | | |
|---|---|---|---|
| 2002/0149276 A1* | 10/2002 | Borden | H02K 11/042 310/68 D |
| 2003/0164651 A1 | 9/2003 | Tornquist et al. | |
| 2008/0122311 A1* | 5/2008 | Werst | H02K 1/30 310/216.004 |
| 2010/0019628 A1* | 1/2010 | Kitzmiller | H02K 11/042 310/68 D |
| 2011/0296672 A1 | 12/2011 | Ganong et al. | |

* cited by examiner

FASTENING ASSEMBLY FOR ELECTRIC MACHINE AND RECTIFIER THEREFOR

BACKGROUND OF THE INVENTION

Electric machines, such as electric motors and/or electric generators, may be used in the generation of electricity. In the aircraft industry, it is common to find combination motors/generators, where the motor is used to power the generator. Regardless of the configuration, generators typically include a generator rotor having main windings that are driven to rotate by a source of rotation, such as an electrical or mechanical machine, which for some aircraft may be a gas turbine engine.

BRIEF DESCRIPTION OF THE INVENTION

In one aspect, a method of assembling a rotating rectifier having multiple radially spaced bus bars with a corresponding fastener to an electrical machine having at least one machine with a stator and a rotor mounted on a rotating shaft, the method includes inserting the rotating rectifier into a hollow portion of the rotating shaft, axially aligning the fasteners with a corresponding radial opening in the rotating shaft, inhibiting the inward radial movement of the fasteners by inserting an inhibiting tool into an interior defined by the multiple radially spaced bus bars, and at least partially securing the fasteners to a corresponding fastener on at least one of the rotor and rotating shaft while the inhibiting tool resides in the interior.

In another aspect, a fastening assembly includes an electrical machine having a rotating shaft having a hollow portion, a plurality of openings extending from the exterior of the shaft to the hollow portion, and an end opening providing access to the hollow portion. The electrical machine further has a rotor mounted to the rotating shaft and having a plurality of first connectors, a stator encircling the rotor, and a rectifier located within the hollow portion and having a plurality of bus bars, each having a second connector to define a plurality of second connectors. The fastening assembly further includes an inhibiting tool having a handle and an inhibiting tip coupled to the handle and sized to be axially received within the end opening of the rotating shaft and having a plurality of inhibiting surfaces, wherein when the inhibiting tip is located within the hollow portion at least two of the inhibiting surfaces cooperate with a corresponding at least two of the second connectors to inhibit the inward radial movement of the second connectors.

DESCRIPTION OF EMBODIMENTS OF THE INVENTION

One embodiment of the invention may be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations may be included in the machine. While this description is primarily directed toward an electric machine providing power generation, it is also applicable to an electric machine providing a driving force and/or an electric machine providing both a driving force and power generation. Further, while this description is primarily directed toward an aircraft environment, one embodiment of invention is applicable in any environment using an electric machine.

Figure 1:
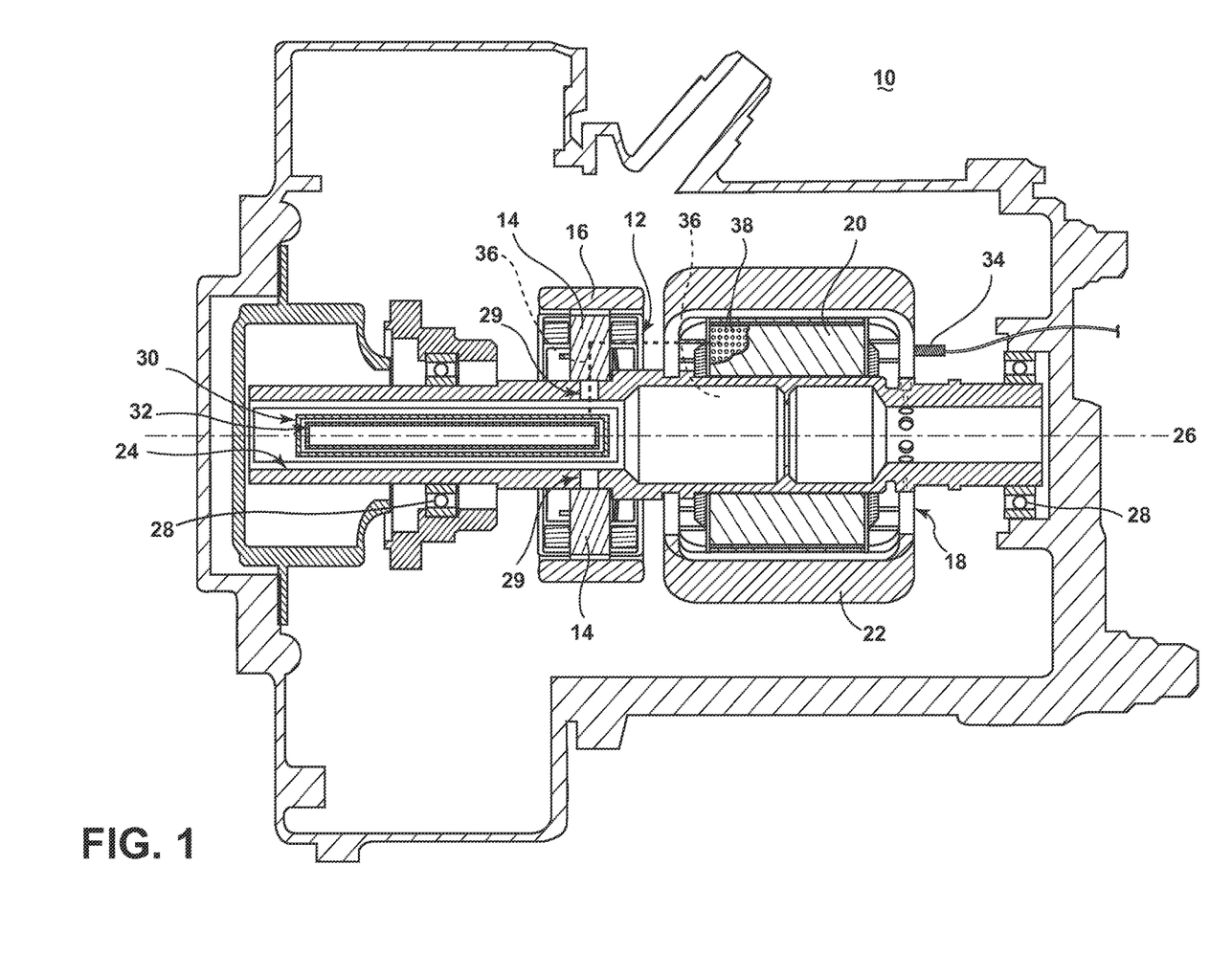
FIG. 1 is a sectional view of an electrical machine assembly.

Turning to one exemplary embodiment of the invention, FIG. 1 schematically illustrates an electrical machine assembly 10 comprising a first machine 12 having an exciter rotor 14 and an exciter stator 16, and a second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 34, to the electrical load and may provide for a three phase with a ground reference output from the electrical machine assembly 10.

The electrical machine assembly 10 further comprises a rotatable shaft 24 mechanically coupled to a source of axial rotation, which may be a gas turbine engine (not shown), about a common axis 26. The rotatable shaft 24 is supported by spaced bearings 28 and includes access openings 29 radially spaced about the shaft 24. The exciter rotor 14 and main machine rotor 20 are mounted to the rotatable shaft 24 for rotation relative to the stators 16, 22, which are rotationally fixed within the electrical machine assembly 10. The stators 16, 22 may be mounted to any suitable part of a housing portion of the electrical machine assembly 10.

The rotatable shaft 24 further comprises at least a hollow portion for enclosing a shaft tube 30, which is contemplated to be non-conducting. The shaft tube 30 is rotationally coupled for co-rotating with the rotatable shaft 24 and further houses a rectifier assembly 32, insulating the rectifier assembly 32 from the rotatable shaft 24.

The exciter rotor 14 is electrically connected to the rectifier assembly 32 by way of conductors 36 (schematically shown as dotted lines). Additionally, the rectifier assembly 32 is electrically connected to the main windings 38 of the main machine rotor 20 by way of conductors 36.

Figure 2:
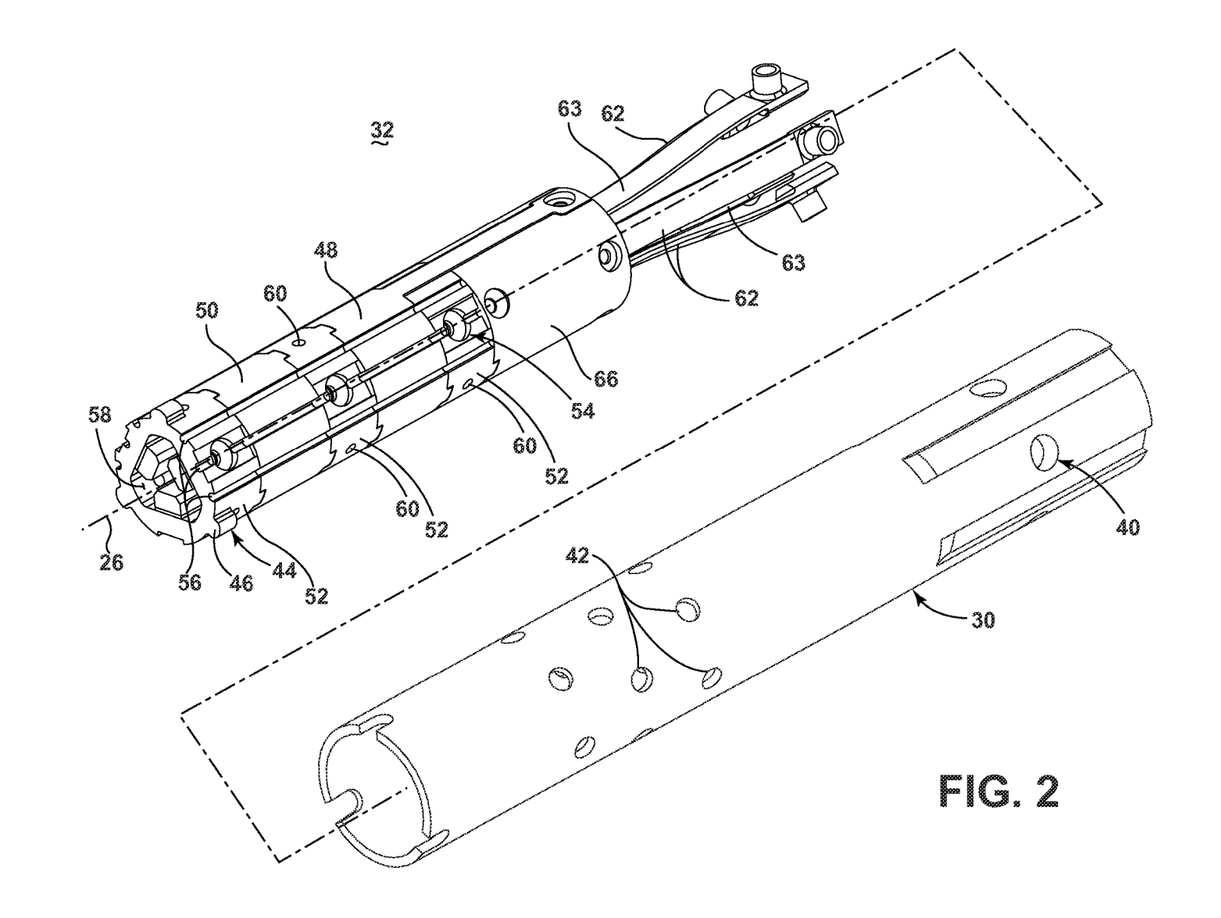
FIG. 2 is a perspective view of the rectifier assembly within the shaft tube.

Turning now to FIG. 2, the details of shaft tube 30 and rectifier assembly 32 will be described. The shaft tube 30 has a substantially cylindrical structure with opposing open ends, and includes five mounting connector openings 40 spaced radially near the aft of the tube 30. The shaft tube 30 is also shown having optional access openings 42, some of which are radially aligned for accessing portions of the rectifier assembly 32.

The rectifier assembly 32 comprises an outer structure having at least one electrical ring and at least one isolating ring 52 that electrically isolates at least a portion of the adjacent electrical rings. The isolating ring 52 may be made of non-conductive material to provide the electrical isolation. The illustrated embodiment shows a conductive first electrical ring 48, a conductive second electrical ring 50, and three isolating rings 52 in an alternating, adjacent placement. Each isolating ring 52 further comprises mechanical fastener openings 54.

The electrical rings 48, 50 and isolating rings 52 comprise coolant grooves 56 that are radially spaced on the external surface of the rings 48, 50, 52. The coolant grooves 56 are configured such that the grooves 56 align axially along the outer structure when the electrical rings 48, 50 and isolating rings 52 are placed adjacently to one another. The coolant grooves 56 provide a channel for coolant to flow along the length of the electrical rings 48, 50 and isolating rings 52.

Additionally, the electrical rings 48, 50 and the isolating rings 52 partially define an axial coolant passage 58, extending axially along the interior of the rings 48, 50, 52. The axial coolant passages 58 allow coolant to flow through the interior of the rectifier assembly 32. The isolation rings 52 further comprise radial coolant passages 60, holes connecting the axial coolant passages 58 to the external surface of the rings 52, configured to allow coolant to flow between the interior and exterior of the rectifier assembly 32.

Alternate placement of the electrical rings 48, 50 and the isolating rings 52 are envisioned. For example, in another embodiment, there may be two electrical rings 48, 50 separated by a single isolating ring 52. In yet another embodiment, two electrical rings 48, 50 may be in electrical contact with each other, with a single isolating ring 52 adjacent to either electrical ring 48, 50.

As shown, the foremost isolating ring 52 comprises three assembly ridges 46 spaced radially and extending normally from the external surface of the ring 52. The shaft tube 30 further comprises cuts 44 spaced radially at the fore of the tube 30. The rectifier assembly 32 and the shaft tube 30 are assembled such that the rectifier assembly 32 is received by the foremost opening of the tube 30 along the common axis 26. When fully received within the shaft tube 30, assembly ridges 46 and the tube cuts 44 are configured to align axially such that the rectifier assembly 32 and the shaft tube 30 may not rotate independently.

The rectifier assembly 32 further comprises conducting AC buss bars 62, DC buss bars 63, and a spacer ring 66.

Figure 3:
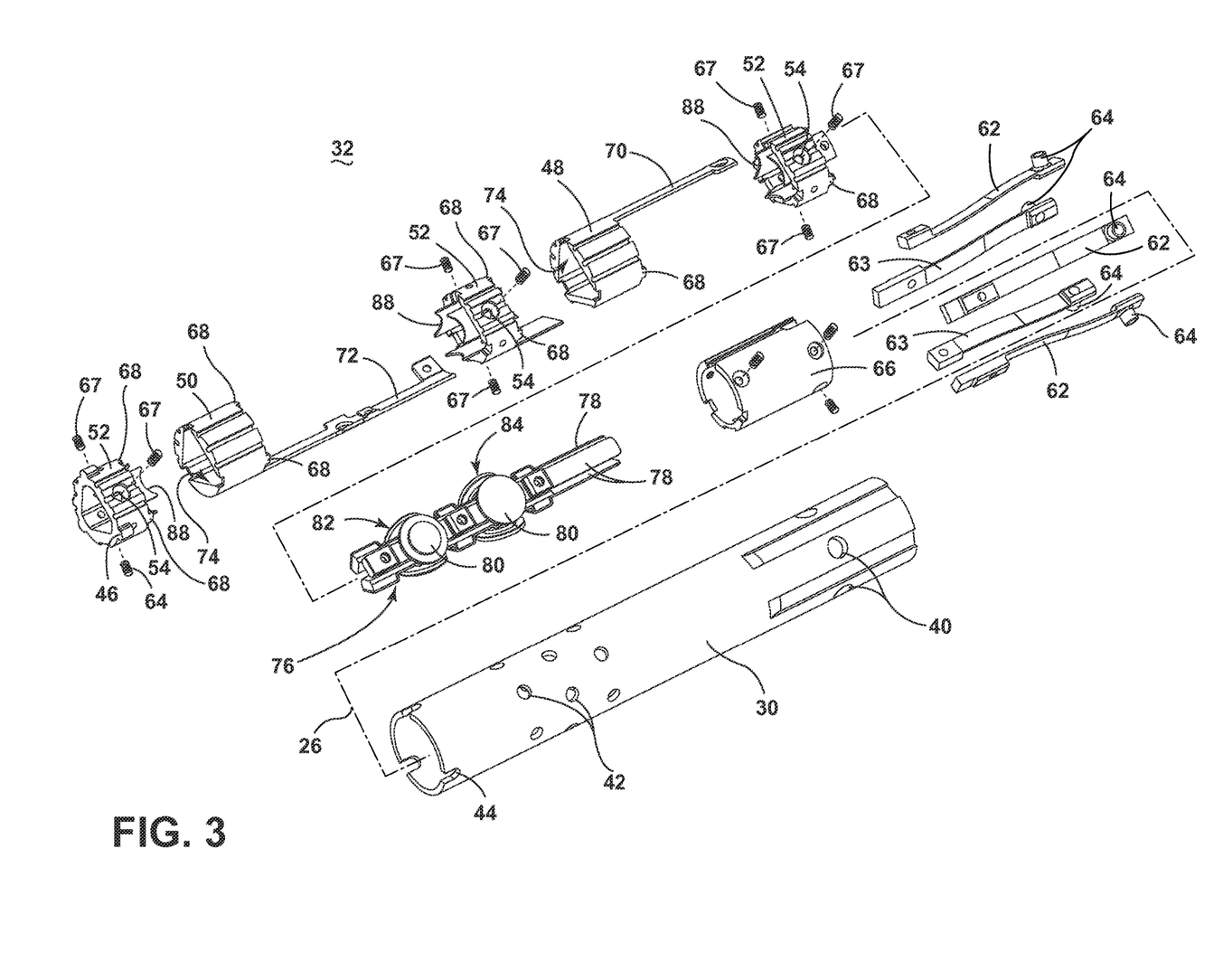
FIG. 3 is an axially exploded view of the rectifier assembly and shaft tube.

FIG. 3 illustrates an axially-exploded perspective view of the rectifier assembly, exploded along the common axis 26. As illustrated, the three AC buss bars 62 receive the respective three-phase AC output of the exciter rotor 14. Additionally, as illustrated, two DC buss bars 63 are used for the transmission of the DC output to the second machine 18. The buss bars 62, 63 are shown radially spaced about the rectifier assembly 32 axis. Alternate arrangements and quantities of AC and DC buss bars 62, 63 are envisioned based on the electrical machine assembly 10 needs and configuration.

The buss bars 62, 63 comprise a first end and a second end, with the first end having mounting connectors 64 for securing the first end of the bars 62 to the first and second machines 12, 18 by way of conductors 36. As illustrated, the mounting connectors 64 are formed simultaneously and conjoined with the first end of the buss bars 62, 63. Alternatively, a fastening component may be provided to aid in the mounting of the mounting connectors 64 to the first end of the buss bars 62, 63. Alternatively, non-mechanical fasteners, such as welding or adhesive may also be used.

The mounting connectors 64 and mounting connector openings 40 are configured such that when the shaft tube 30 and the rectifier assembly 32 are assembled, the connectors 64 are received by the openings 40 to provide for electrical connections between the AC connectors 64 and the first machine 12, and the DC connectors 64 and the second machine 18. The electrical connections may be any suitable mechanical or non-mechanical fasteners.

The rectifier assembly 32 is further shown comprising an optional spacer ring 66 positioned between the electrical and isolating rings 48, 50, 52, and the buss bars 62, 63. The spacer ring 66 is configured with mechanical fasteners 67, such as heli-coils, to allow for fastening to both the isolating ring 52 and the second end of the buss bars 62, 63. The mechanical fasteners 67 are configured to provide for alignment and fastening of the AC input terminals 78 and DC output terminals 70, 72 to their respective AC and DC buss bars 62, 63. An alternate embodiment wherein the AC and DC terminals 70, 72, 78 are directly secured to the respective AC and DC buss bars 62, 63 without the use of a space ring 66 is envisioned. Other suitable mechanical fasteners, e.g. screws, bolts, nails, pins, etc., may be used as well.

The electrical rings 48, 50, isolating rings 52, and spacer ring 66 are shown with corresponding notches 68, allowing the rings 48, 50, 52, 66 to secure to each other to allow for alignment and prevent independent rotation. Alternate physical or keyed notch 68 configurations allowing for proper alignment are envisioned.

The rectifier assembly is shown comprising a diode assembly 76 having circular diodes 80. As illustrated, the diode assembly 76 comprises a set of three outward-facing, forward-biased diodes 82 and three inward-facing, reversed-biased diodes 84, with each set 82, 84 configured around a center structure in a substantially triangular manner.

The diode assembly 76 further comprises a first end having AC terminals 78. When the rectifier assembly 32 is assembled, the three AC terminals 78 extend axially towards aft, through the spacer ring 66, to be electrically secured to the respective AC buss bars 62.

As illustrated, the first electrical ring 48 further comprises a first DC terminal 70 and the second electrical ring 50 further comprises a second DC terminal 72. Each of the DC terminals 70, 72 extend axially on the external surface of the isolating rings 52 towards the DC buss bars 63. When the rectifier assembly 32 is assembled, each of the DC terminals 70, 72 are electrically secured to the respective two DC buss bars 63.

The first electrical ring 48 and the second electrical ring 50 further comprise at least one diode seat 74, providing an electrically conductive, substantially flat internal surface for receiving a diode 80. As illustrated, each electrical ring 48, 50 has three diode seats 74, defining a substantially triangular inner surface of the rings 48, 50.

The isolating rings 52 further comprise diode securing sidewalls 88 positioned axially away from the rings 52 and having semicircular structures for abutting the circular diodes 80. Furthermore, each isolating ring 52 further comprises mechanical fastener openings 54 for receiving a mechanical fastener 67, illustrated as a heli-coil.

Figure 4:
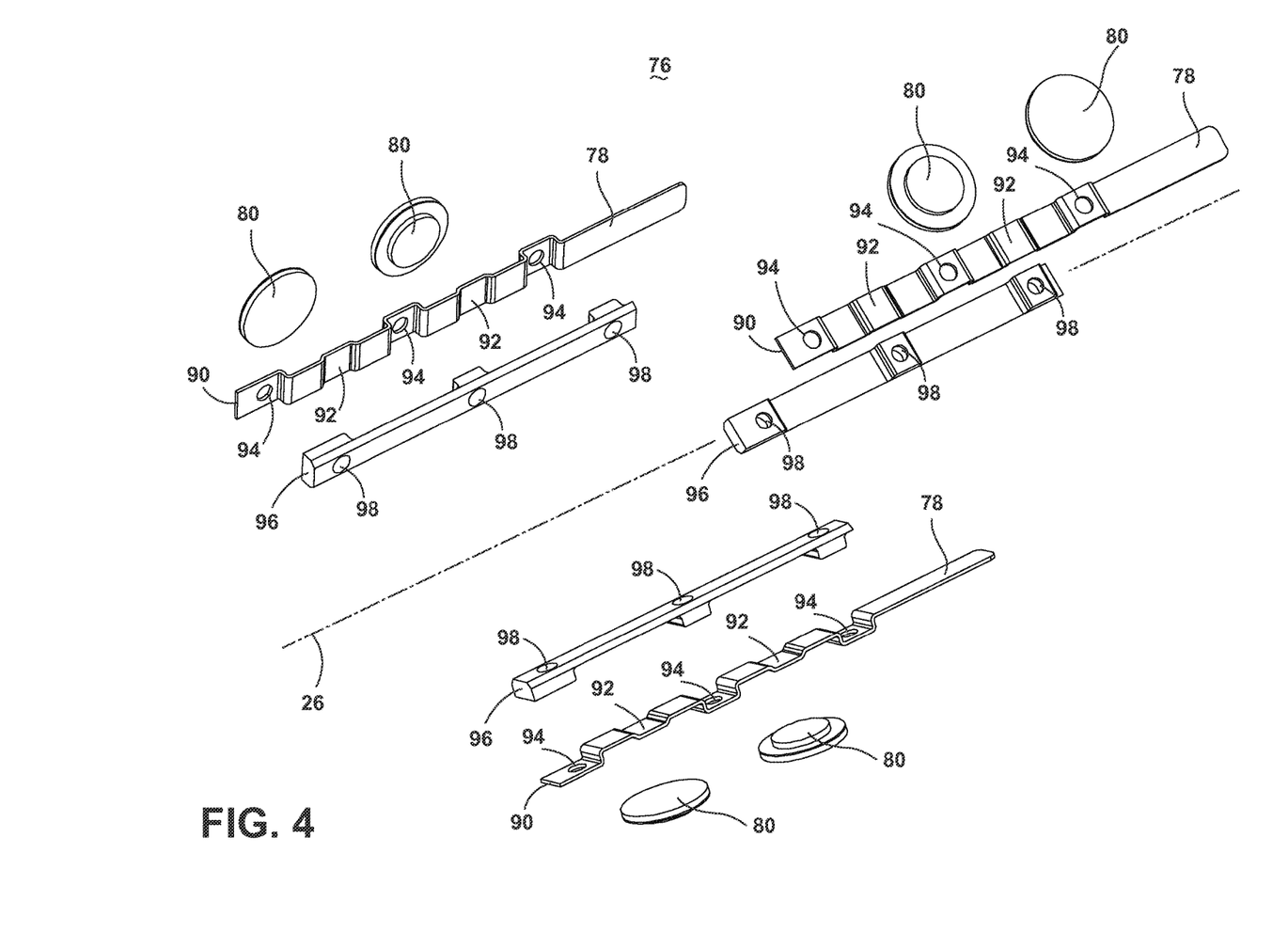
FIG. 4 is a radially exploded view of the diode assembly.

Turning now to FIG. 4, the diode assembly 76 will be defined in greater detail. The diode assembly 76 further comprises conductive terminal bars 90 having physical protrusions 92, fastener pass-through openings 94, and the aforementioned AC terminals 78. The terminal bars 90, as embodied, are formed from copper, but may alternately be formed or machined by any suitable conductive material. The physical protrusions 92 extend slightly normally outward, with a surface suitable for making conductive contact with one diode 80 from each diode set 82, 84. Alternate physical protrusions 92 are envisioned for making conductive contact with the diodes 80.

The diode assembly 76 further comprises isolating clamping bars 96 that electrically isolate at least a portion of the one AC terminal 78 from adjacent terminals 78. The clamping bars 96 may be made of non-conductive material to provide the electrical isolation. Each clamping bar 96 includes at least one threaded fastener base 98 for receiving the mechanical fastener 67. In alternate mechanical fastener embodiments, the fastener base 98 would be replaced by a suitable mounting point.

The fastener bases 98 of a clamping bar 96 are configured to correspond with both the fastener pass-through openings 94 of a terminal bar 90 and the mechanical fastener openings 54 of the isolating rings 52. Likewise, the first electrical ring 48 set of diode seats 74 are configured to correspond with the reverse-biased diode set 84 and one set of physical protrusions on the terminal bars 90, and the second electrical ring 50 set of diode seats 74 are configured to correspond with the forward-biased diode set 82 and the other set of physical protrusions on the terminal bars 90.

The assembling of the diode assembly 76 will now be described in further detail. When the first and second electrical rings 48, 50 and the isolating rings 52 are adjoined, diodes 80 are overlain on the surface of each of the diode seats 74, such that the seats 74 of the first electrical ring 48 are overlain with the reverse-biased diode set 84 and the seats 74 of the second electrical ring 50 are overlain with the forward-biased diode set 82. Each diode 80 is then overlain with one of the three terminal bars 90, followed by each terminal bar 90 being overlain by a clamping bar 96. Finally, a mechanical fastener 67 is inserted into each mechanical fastener opening 54 of the isolating rings 52, extending through the fastener pass-through openings 94 of the terminal bars 90, and fastened into the fastener base 98 of the clamping bar.

The fastening of the mechanical fastener 67 into the fastener base 98 compresses the clamping bar 96 against the inner surface of the isolating rings 52, such that the physical protrusions 92 clamp the diodes 80 radially against the first and second electrical rings 48, 50. The diode securing sidewalls 88 of the isolating rings 52 further clamp the diodes 80 axially, to prevent unintended electrical contacts from occurring.

The rectifier assembly 32 is axially secured to the shaft tube 30 when the mounting connectors 64 are secured to the first and second machines 12, 18 through the mounting connector openings 40. Additionally, when fully assembled, at least a portion of the access openings 42 align with the mechanical fastener openings 54 of the isolating rings 52, allowing visual inspection and adjustment of the mechanical fastener.

During generator operation, the rotatable shaft 24 is driven by the source of axial rotation. The rotation of the mounted exciter rotor 14, adjacent to the exciter stator 16, generates a three-phase AC current, which is delivered to three respective AC buss bars 62 by the conductors 36 and mounting connectors 64. Each phase of the AC current is transmitted from the buss bar 62 to the AC terminal 78, and resultantly, to one diode 80 from each forward and reversed-biased diode set 82, 84. The diodes operate to rectify the full wave AC current to DC current. At zero or low RPMs of the rotatable shaft 24, the diodes 80 are compressively retained in place by the physical protrusions 92 of the AC terminal 78, as drawn against the diodes 80, to the diode seat 74 of the electrical rings 48, 50 by the mechanical fasteners 67. At higher RPMs, centrifugal force, in addition to the compressive force, help to retain the diodes 80 in place.

The reversed-biased diode set 84 outputs DC current to the first electric ring 48 and the forward-biased diode set 82 outputs DC current to the second electric ring 50. The two DC output currents are delivered to the respective DC buss bars 63, where they are transmitted by the mounting connectors 64 and conductors 36 into the main windings 38 of the main machine rotor 20. The rotation of the main machine rotor 20 about the main machine stator 22 generates the electricity that is used to power the generator load.

During operation of the electrical machine assembly 10, the configuration of the coolant grooves 56, the axial coolant passage 58, and the radial coolant passages 60 allows for coolant to traverse the interior and exterior of the rectifier assembly 32, cooling any transient or steady-state temperature conditions that develop at the electrical rings 48, 50, the isolating rings 52, or the diode assembly 76. Alternate coolant configurations are envisioned.

Figure 5:
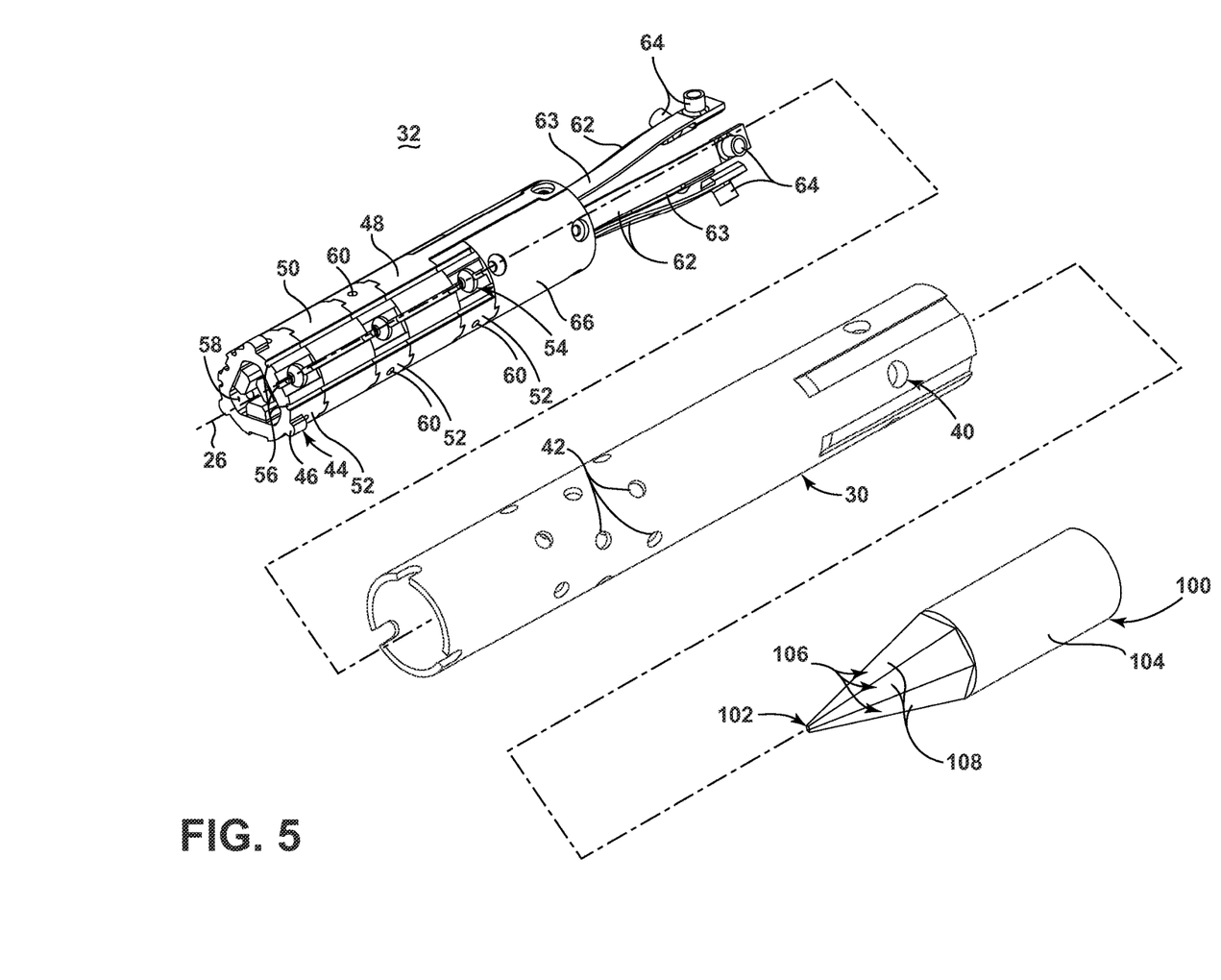
FIG. 5 is a perspective view of the rectifier assembly, shaft tube, and inhibiting tool.

As shown in FIG. 5, an inhibiting tool 100, comprising a first end having an inhibiting tip 102 and a second end having a grip or handle 104, is used during the fastening of the AC and DC buss bars 62, 63 to the first and second machine 12, 18. The tip 102 is sized to be axially received within the end opening of the rotatable shaft tube 30 and rectifier assembly 32, and further comprises a plurality of radially spaced inhibiting fingers 106, each having an inhibiting surface 108. The tip 102 has one finger 106 and surface 108 to correspond to each AC or DC buss bar 62, 63, with each surface 108 is radially sloped inward as the surface 108 approaches the tip 102. While the fingers 106 are illustrated as physically separate, it is possible for some of the fingers 106 to be physically a single piece, with multiple surfaces 108.

Figure 6:
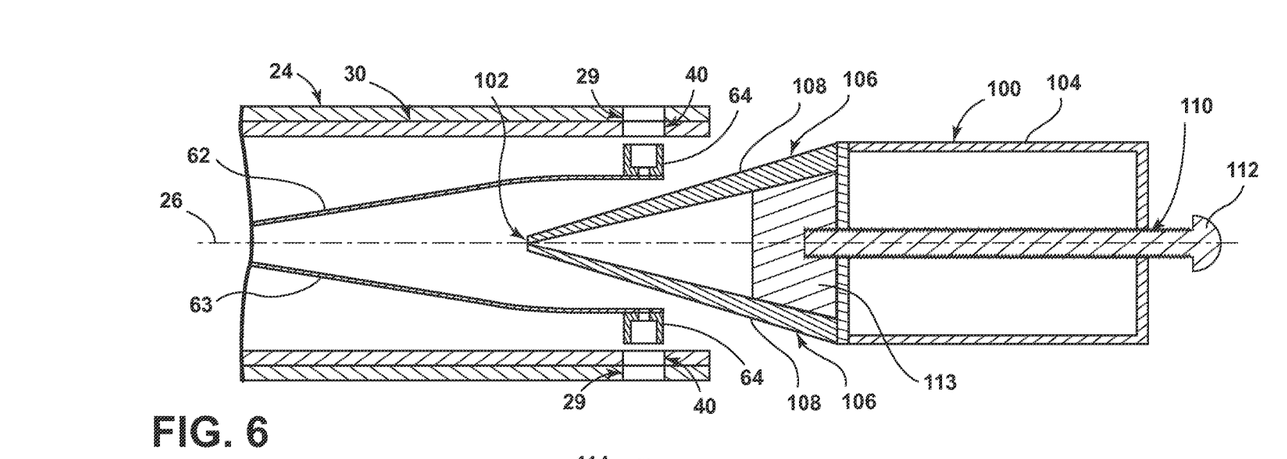
FIG. 6 is a sectional view of the inhibiting tool inserted into the rectifier assembly for fastening activity.

As illustrated in FIG. 6, the handle 104 further comprises a threaded opening 110 configured to receive a mechanical element, such as a bolt 112. The tool 100 further comprises an expansion nut 113 within the tip 102 that is configured to couple with the bolt 112, and is able to extend axially toward the tip 102. The tool 100 is thus arranged in such a way that as the bolt 112 is threaded into the handle 104, the nut 113 extends axially toward the tip 102, wherein the contact of the nut 113 with the inner surface of the fingers 106 causes the fingers 106 radially expand. Alternative configurations to allow for controlled expansion of the fingers 106 are envisioned.

Fastening of the AC and DC buss bars 62, 63 to the first and second machine 12, 18 occurs by first inserting the assembled rectifier assembly 32 axially into the shaft tube 30. Next the shaft tube 30 is inserted axially into the rotatable shaft 24. Then, the mounting connectors 64, mounting connector openings 40, and access openings 29 are radially aligned. The tool 100 is then aligned along the common axis 26 with the tip 102 toward to the AC and DC buss bars 62, 63. As shown, the tip 102 is axially received within the end opening of the rotatable shaft tube 30 and the rectifier assembly 32, until the tip 102 is positioned radially inward of the buss bars 62, 63. It is contemplated that the tool 100 may have a stop that interacts with the shaft tube 30 or the shaft 24 to limit the axial insertion of the tool 100 at the proper axial location for operation.

Figure 7:
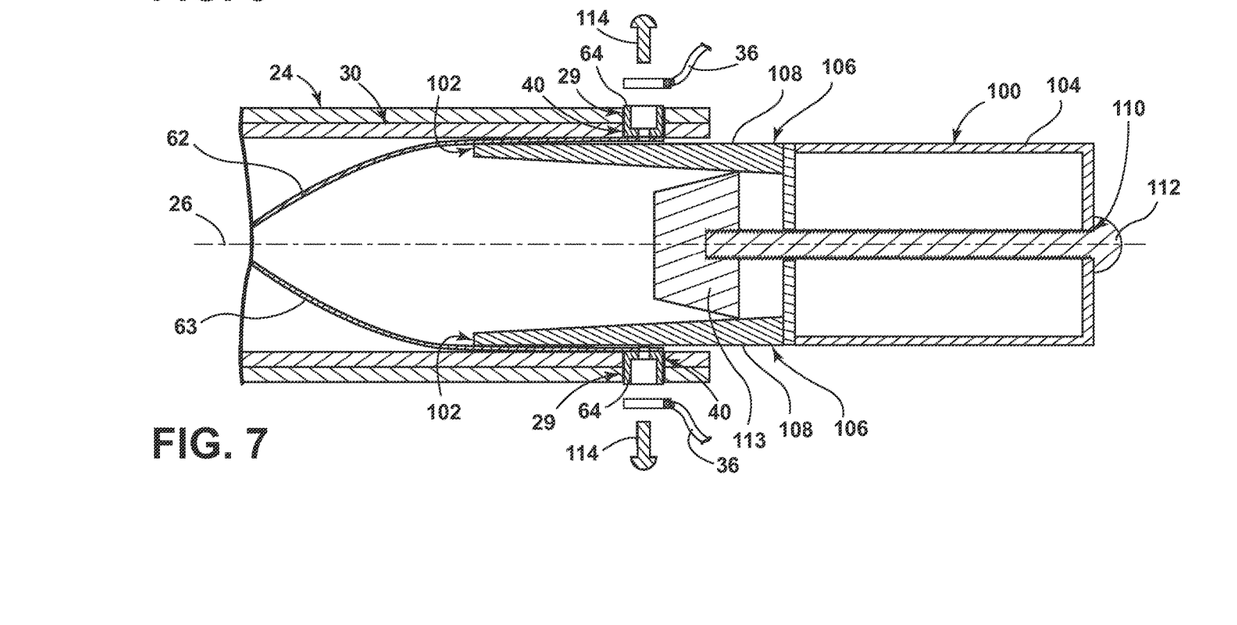
FIG. 7 is a sectional view of the expanded inhibiting tool inserted into the rectifier assembly for fastening activity.

As shown in FIG. 7, after axially locating the tool 100, the fingers 106 are expanded by threading the bolt 112 into the handle 104.

The expansion of the fingers 106 brings the surfaces 108 into contact with the AC and DC buss bars 62, 63. The cooperation of the surfaces 108 with the respective AC and DC buss bars 62, 63 urges the mounting connectors 64 outwardly through the mounting connector openings 40 and access openings 29. It is envisioned that the tool 100 is configured to remain in cooperation with the buss bars 62, 63 without the need for assembler supervision of the handle 104. For example, cooperation of the surfaces 108 with the buss bars 62, 63 may axially couple the tool 100 in place.

The tool 100 may be manually held in the axial position or it may be coupled to at least some part of the electrical machine, such as at least one of the rotatable shaft, tube shaft 30 or rectifier assembly 32 after insertion. Physically coupling the tool 100 to some part of the electrical machine frees both hands of the assembler during assembly.

Once the mounting connectors 64 are exposed through the mounting connector openings 40 and access openings 29, an assembler aligns the AC buss bars 62 with the conductors 36 electrically coupled to the first machine 12 and the DC buss bars 63 with the conductors 36 electrically coupled to the second machine 18. Next, the assembler at least partially secures the respective buss bars 62, 63 to the conductors 36 using a fastener, such as a threaded screw 114. During fastening, the surfaces 108 also prevent the buss bars 62, 63 from inward radial movement or deflection when exposed to an inwardly-directed force, for example, by the assembler fastening the screws 114. Once the fastening of the buss bars 62, 63 to the first and second machines 12, 18 is complete, the tool 100 may be removed.

Figure 8:
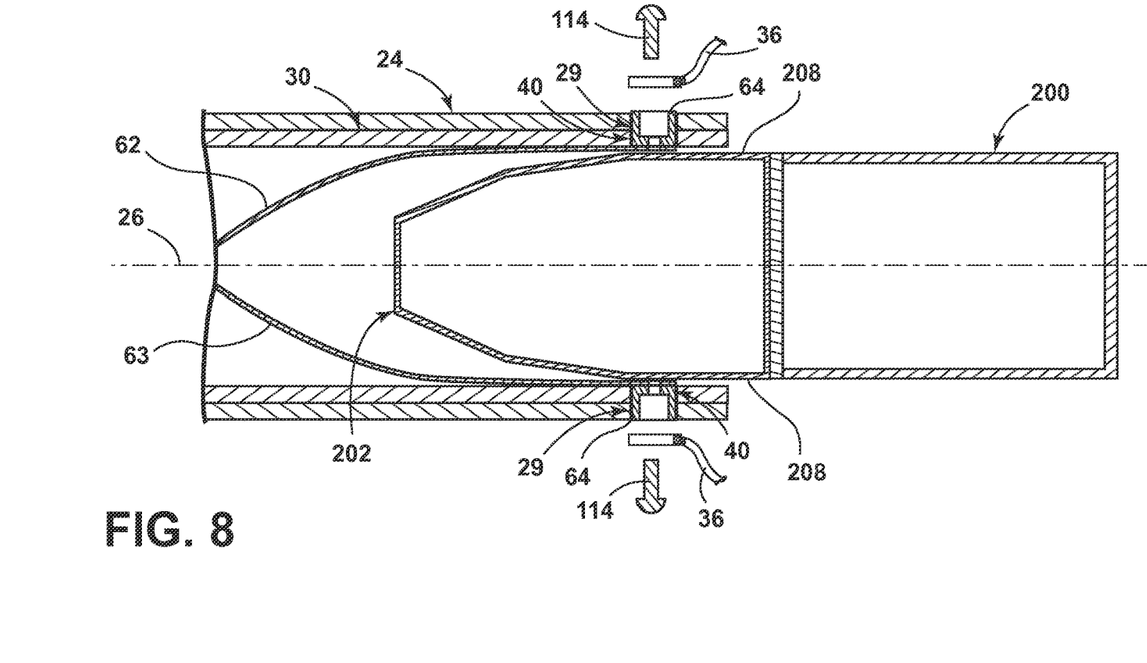
FIG. 8 is a sectional view of the inhibiting tool inserted into the rectifier assembly for fastening activity according to a second embodiment of the invention.

Furthermore, FIG. 8 illustrates an alternative inhibiting tool 200 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the tip 202 of the tool 200 comprises a plurality of radially spaced and sloped surfaces 208, but not movable fingers 106. Additionally, this embodiment does not include an opening 110, bolt 112, or nut 113.

Fastening of the AC and DC buss bars 62, 63 to the first and second machine 12, 18 occurs by inserting the tip 202 of the tool 200 into the shaft tube 30 and rectifier assembly 32 along the common axis 26. As the tip 202 is axially received, the surfaces 208 radially cooperate with their respective AC and DC buss bars 62, 63. This cooperation urges the mounting connectors 64 outward through the mounting connector openings 40 and access openings 29. It is envisioned that the tool 200 is configured to remain in cooperation with the buss bars 62, 63 without the need for assembler supervision of the handle 104. For example, the tool 200 may be axially coupled to the tube shaft 30 or rectifier assembly 32 after insertion. In this embodiment, the assembler would be free to use both free hands to complete assembly. Then, as with the first embodiment, the assembler at least partially secures the respective buss bars 62, 63 to the conductors 36 using a fastener, such as a screw 114.

Many other possible embodiments and configurations in addition to that shown in the above figures are contemplated by the present disclosure. For example, one embodiment of the invention contemplates alternate configurations of forward or reverse-biased diode sets that may provide for half-wave rectification. Another example may include a single electrical ring wherein both diode sets rectify the current to a single DC output. Yet another example of the invention contemplates using a self-contained oil system for cooling, or air for cooling. Furthermore, a different example of the invention may forgo the shaft tube 30 altogether and provide for the rectifier assembly to be received directly into the rotatable shaft. Moreover, the design and placement of the various components may be rearranged such that a number of different in-line configurations could be realized.

Furthermore, other embodiments and configurations allowing for alternate assembly are contemplated by the present disclosure. For example, the tip 102 of the tool 100 may include fewer surfaces 108 than buss bars 62, 63. In this embodiment, assembly using the tool 100 may comprise of inserting the tool 100, fastening at least one screw 114, and then adjusting the tool to cooperate with different buss bars 62, 63 to repeat the process. A further example of the invention contemplates a tool 100 configured to be coupled or in connection with the shaft tube 30 or rectifier assembly 32 by a single hand supervising the handle 104. In this example, the assembler would have the opposing hand free to complete assembly.

One advantage that may be realized in the above embodiments is that the above described embodiments have superior weight and size advantages over the conventional type generator rectification systems. With the proposed rotating arrangement, current rectification can be achieved without the external space constraints of additional circuitry. Additionally, the construction and assembly of the rectifier will result in reduced maintenance downtime. Yet another advantage of the above embodiments is that the oil or coolant already present in the rotating shaft may be used to maintain the rectifier assembly, saving additional weight and size of a separate component. A further advantage of the above embodiments is that it reduces the risks of the diode bridge electrically shorting to a metallic shaft. Moreover, a high peripheral speed (up to 42,000 RPM) can be achieved due to the reduced centrifugal forces of moving the assembly closer to the common axis of rotation. The higher peripheral speed results in a lower generator electromagnetic weight.

When designing aircraft components, important factors to address are size, weight, and reliability. The above described rectifier assembly have a decreased number of parts as the system will be able to provide rectified DC outputs with minimal power conversion equipment, making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

Another advantage of the above embodiments is that the tool 100 may be used to radially support, by abutment, the buss bars 62, 63 during assembly. While fastening, radially-inward force used in securing the mounting connectors 64 to the first and second machine 12, 18 can be countered by the supporting surfaces 108, preventing unintended bending, biasing, or breakage of the buss bars 62, 64.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling a rotating rectifier having multiple radially spaced bus bars each having a corresponding fastener to an electrical machine having at least one machine with a stator and a rotor mounted on a rotating shaft, the method comprising:
   inserting the rotating rectifier into a hollow portion of the rotating shaft;
   axially aligning the fasteners with at least one corresponding radial opening in the rotating shaft;
   inhibiting an inward radial movement of the fasteners by inserting an inhibiting tool into an interior defined by the multiple radially spaced bus bars; and
   at least partially securing the fasteners of each bus bar to a corresponding fastener on at least one of the rotor and rotating shaft while the inhibiting tool resides in the interior.

2. The method of claim 1 wherein the inserting of the inhibiting tool effects the inhibiting of the inward radial movement of the fasteners of each bus bar.

3. The method of claim 1 wherein the at least partially securing the fasteners of each bus bar to a corresponding fastener comprises threadably coupling the fasteners of each bus bar to the corresponding fastener.

4. A method of assembling a rotating rectifier having multiple radially spaced bus bars each having a corresponding fastener to an electrical machine having at least one machine with a stator and a rotor mounted on a rotating shaft, the method comprising:
   inserting the rotating rectifier into a hollow portion of the rotating shaft;
   axially aligning the fasteners with at least one corresponding radial opening in the rotating shaft;
   inhibiting an inward radial movement of the fasteners by inserting an inhibiting tool into an interior defined by the multiple radially spaced bus bars; and
   at least partially securing the fasteners of each bus bar to a corresponding fastener on at least one of the rotor and rotating shaft while the inhibiting tool resides in the interior;
   wherein the inhibiting the inward radial movement of the fasteners of each bus bar comprises one of urging at least a portion of at least some of the fasteners of each bus bar toward the corresponding radial opening and simultaneously urging all of the fasteners of each bus bar toward the corresponding radial openings.

5. The method of claim 4 wherein the urging the fasteners of each bus bar toward the radial openings comprises biasing at least some of the bus bars toward the corresponding radial openings.

6. The method of claim 5 wherein the inserting of the inhibiting tool effects the biasing of at least some of the bus bars toward the corresponding radial openings.

7. The method of claim 6 wherein the inserting of the inhibiting tool comprises moving a ramp surface against the at least some of the bus bars to biasing the at least some of the bus bars toward the corresponding radial openings.

8. A method of assembling a rotating rectifier having multiple radially spaced bus bars each having a corresponding fastener to an electrical machine having at least one machine with a stator and a rotor mounted on a rotating shaft, the method comprising:
   inserting the rotating rectifier into a hollow portion of the rotating shaft;
   axially aligning the fasteners with at least one corresponding radial opening in the rotating shaft;
   inhibiting an inward radial movement of the fasteners by inserting an inhibiting tool into an interior defined by the multiple radially spaced bus bars; and
   at least partially securing the fasteners of each bus bar to a corresponding fastener on at least one of the rotor and rotating shaft while the inhibiting tool resides in the interior;
   wherein the inserting of the inhibiting tool effects the inhibiting of the inward radial movement of the fasteners; and
   wherein the inserting of the inhibiting tool comprises moving a ramp surface against the at least some of the bus bars to inhibit the inward radial movement of the fasteners.

9. A fastening assembly comprising:
   an electrical machine comprising:
      a rotating shaft having a hollow portion, a plurality of openings extending from the exterior of the shaft to the hollow portion, and an end opening providing access to the hollow portion;
      a rotor mounted to the rotating shaft and having a plurality of first connectors;
      a stator encircling the rotor;
      a rectifier located within the hollow portion and having a plurality of bus bars, each having a second connector to define a plurality of second connectors; and
   an inhibiting tool comprising:
      a handle;
      an inhibiting tip coupled to the handle and sized to be axially received within the end opening of the rotating shaft and having a plurality of inhibiting surfaces;
   wherein when the inhibiting tip is located within the hollow portion at least two of the inhibiting surfaces cooperate with a corresponding at least two of the second connectors to inhibit an inward radial movement of the second connectors.

10. The fastening assembly of claim 9 wherein the plurality of inhibiting surfaces have at least one inhibiting surface corresponding to each of the second connectors.

11. The fastening assembly of claim 9 wherein the inhibiting surfaces comprise at least one ramp surface abutting at least one of a corresponding bus bar and second connector upon axial insertion.

12. The fastening assembly of claim 11 wherein after abutting contact between the at least one ramp surface and the at least one of the corresponding bus bar and second connector, further axial insertion of the inhibiting tip radially outwardly biases the at least one of the corresponding bus bar and the second connector.

13. The fastening assembly of claim 9 wherein the plurality of bus bars are axially spaced to define a central region radially inward of the bus bars.

14. The fastening assembly of claim 13 wherein the inhibiting tip is sized to be received within the central region.

* * * * *